(12) United States Patent
Emerson et al.

(10) Patent No.: US 7,414,991 B2
(45) Date of Patent: Aug. 19, 2008

(54) COMPUTING SYSTEM AND METHOD TO SELECT DATA PACKET

(75) Inventors: David Emerson, San Jose, CA (US); Seh Kwa, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 10/002,333

(22) Filed: Nov. 14, 2001

(65) Prior Publication Data

US 2003/0091067 A1    May 15, 2003

(51) Int. Cl.
*H04Q 7/00* (2006.01)
(52) U.S. Cl. .................................. 370/330; 455/452.1
(58) Field of Classification Search ................ 370/230, 370/252, 312, 390, 392, 400–401, 458–459, 370/468, 473
See application file for complete search history.

(56) References Cited

U.S. PATENT DOCUMENTS

| | | | | |
|---|---|---|---|---|
| 4,715,045 A | * | 12/1987 | Lewis et al. ................. | 370/527 |
| 6,671,284 B1 | * | 12/2003 | Yonge et al. ................. | 370/462 |
| 6,704,346 B1 | * | 3/2004 | Mansfield .................... | 370/330 |
| 2002/0061031 A1 | * | 5/2002 | Sugar et al. ................. | 370/445 |
| 2002/0151275 A1 | * | 10/2002 | Trost et al. ................... | 455/41 |
| 2003/0021262 A1 | * | 1/2003 | Ma et al. ..................... | 370/352 |

* cited by examiner

*Primary Examiner*—Huy D. Vu
*Assistant Examiner*—Phuongchau B Nguyen
(74) *Attorney, Agent, or Firm*—Blakely, Sokoloff, Taylor & Zafman LLP

(57) ABSTRACT

A method for selecting data packets includes including identifying available data packets for transmission, determining a number of time-slots available for the transmission, identifying data packet types that fit into the available time-slots and meet a minimum transfer length requirement, and determining whether any of the identified data packet types are capable of transmitting the entire required data length. If so, a data packet type capable of transmitting most data in the shortest time is chosen for the transmission from the data packet types capable of transmitting the entire required data length. If not, a data packet type capable of transmitting most data in the shortest time is chosen for the transmission from the identified data packet types.

9 Claims, 5 Drawing Sheets

Time-division multiplexing of isochronous traffic with available slots for asynchronous traffic

COMPUTING SYSTEM AND METHOD TO SELECT DATA PACKET

FIELD OF THE INVENTION

The present invention relates to data communications. Specifically, the present invention relates to a computing system and a method to dynamically select a data packet to efficiently transmit data.

BACKGROUND

When transmitting data from one device to another, it is common for a large stream of data to be broken up into smaller packets of data in order to facilitate transmission. Breaking a large data stream into smaller packets facilitates retransmission and recovery should elements of the data stream become lost or corrupted. Breaking a large data stream into smaller packets may be completed using either hardware or software approaches.

The current segmentation approaches tend to identify the possible packet types and then select a single packet that encompasses the entire data stream. This requires either utilizing a small packet or avoiding transmission if available time does not accommodate the packet.

BRIEF DESCRIPTION OF THE DRAWINGS

The present invention is illustrated by way of example and not limitation in the figures of the accompanying drawings, in which.

DETAILED DESCRIPTION

A computing system and a method to dynamically segment a data stream into smaller packets is disclosed. The packets are chosen from within the constraints of multiple packet choices with varying, but limited, packet sizes. Each segment of data is thus identified by a packet and transmission length.

In this description, the term "time slot " refers to a fixed amount of time for data transmission. This is typically a constant, such as 625 microseconds, by way of example. Also, in this description, the term "packet type " refers to an identifier that specifies the characteristics of the transmission. A packet type may characterize the transmission as utilizing a fixed number of slots (e.g., 1, 3 or 5 slots) and having a maximum data length In short-range radio technologies, such as Bluetooth technology, the packet type specifies the number of slots allowed, the maximum data that can be transmitted in the slots, and the data encoding style for Forward Error Correction, if any. In the ensuing description, the terms "data packet type " and "data packet " are used interchangeably.

The computing system and the method of the present invention allow data segmentation "on the fly." In one embodiment, the algorithm of the present invention allows dynamic packet sizing to allow the packet to fit into the available timeslots. The present invention improves packet transmission, especially in protocols such as Bluetooth 1.0 specification. The present invention also reduces the need to put the segmentation methodology in software. By implementing the segmentation methodology in hardware, lower power and lower gate-count can be achieved, typically reducing manufacturing cost and providing longer battery life. The algorithm of the present invention can be implemented in products such as routers and switches.

Figure 1A:
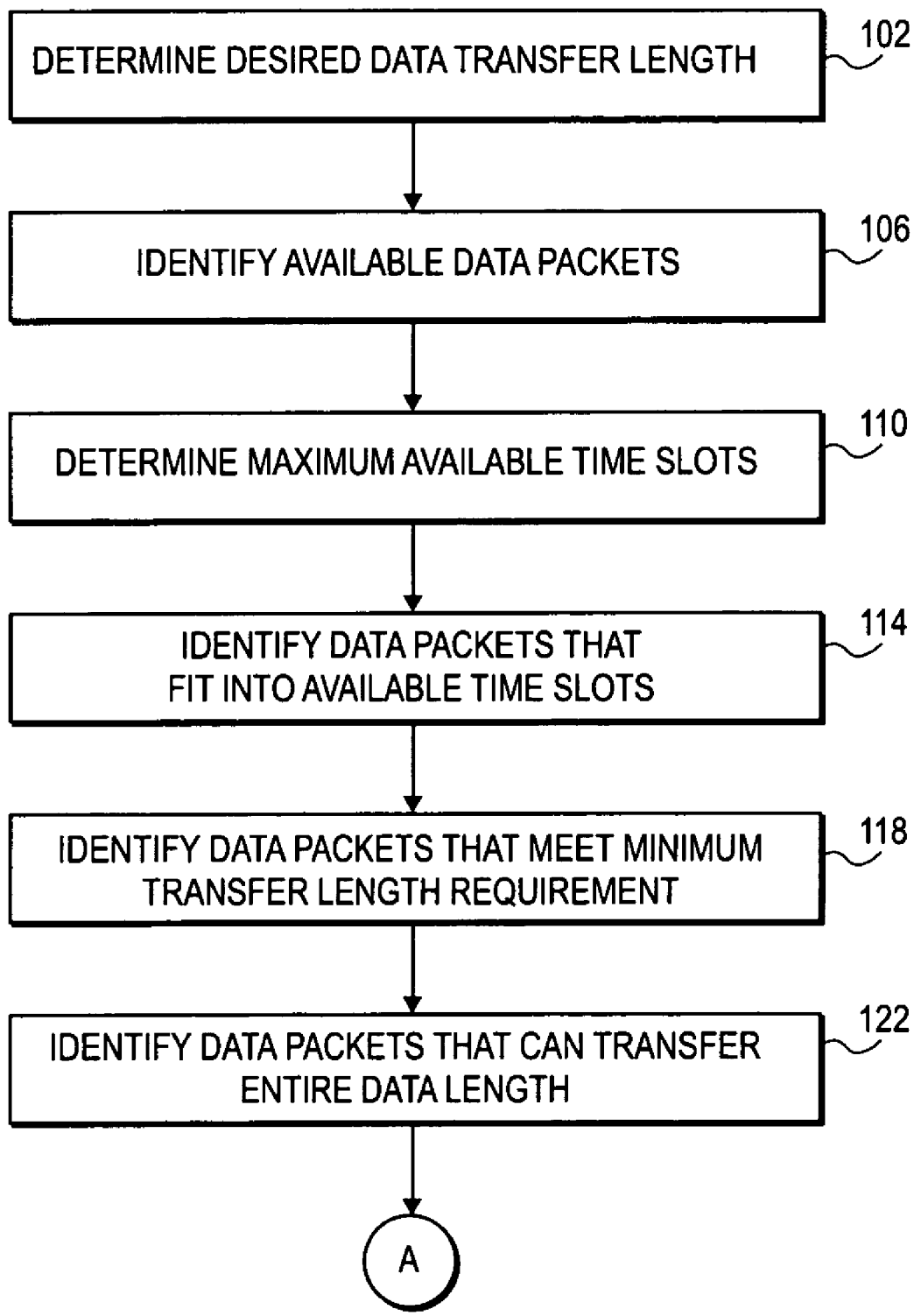
FIGS. 1A, 1B, and 1C illustrate one embodiment of a flowchart of the method to dynamically select a data packet.
Figure 1B:
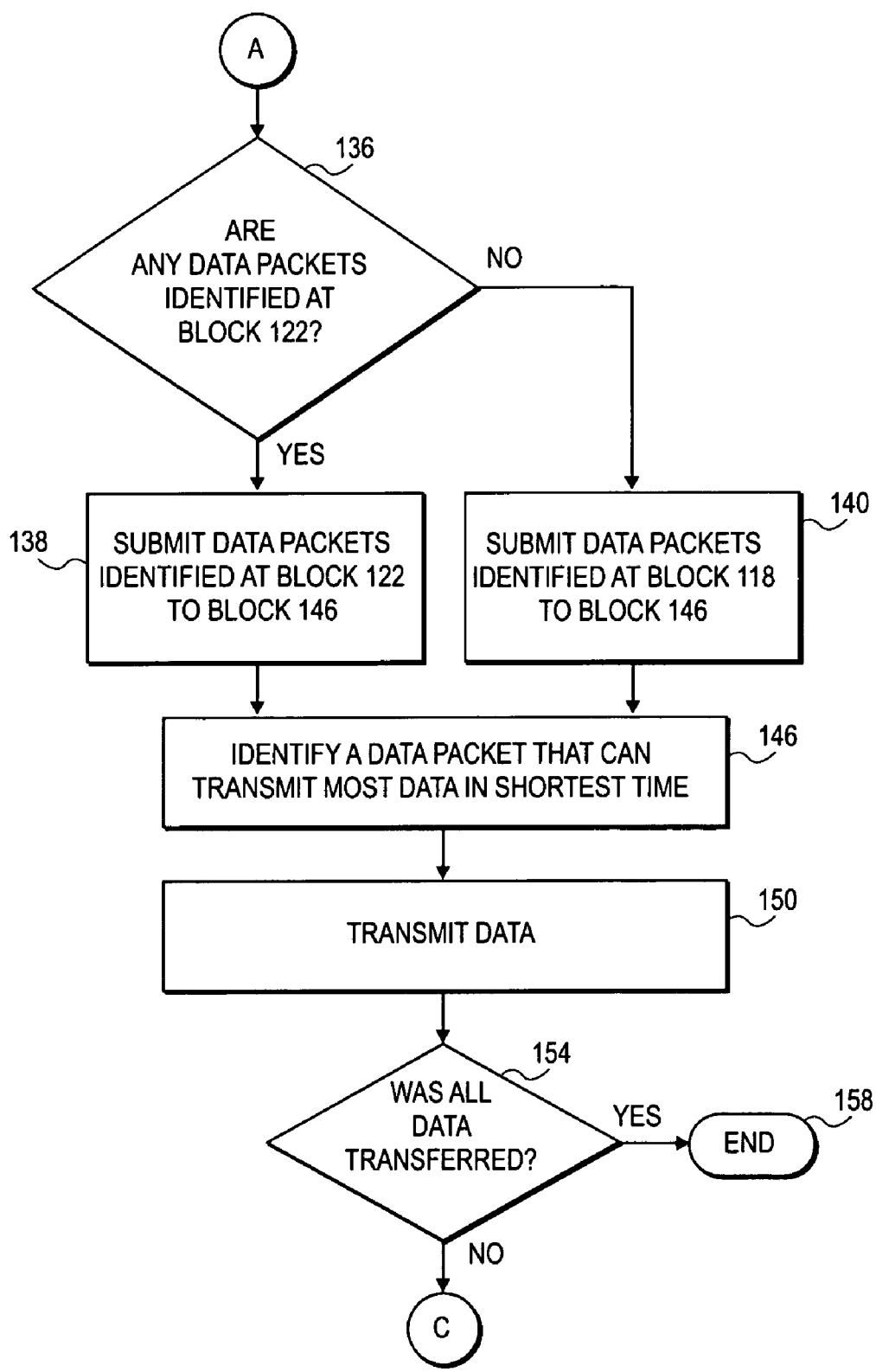
Figure 1C:
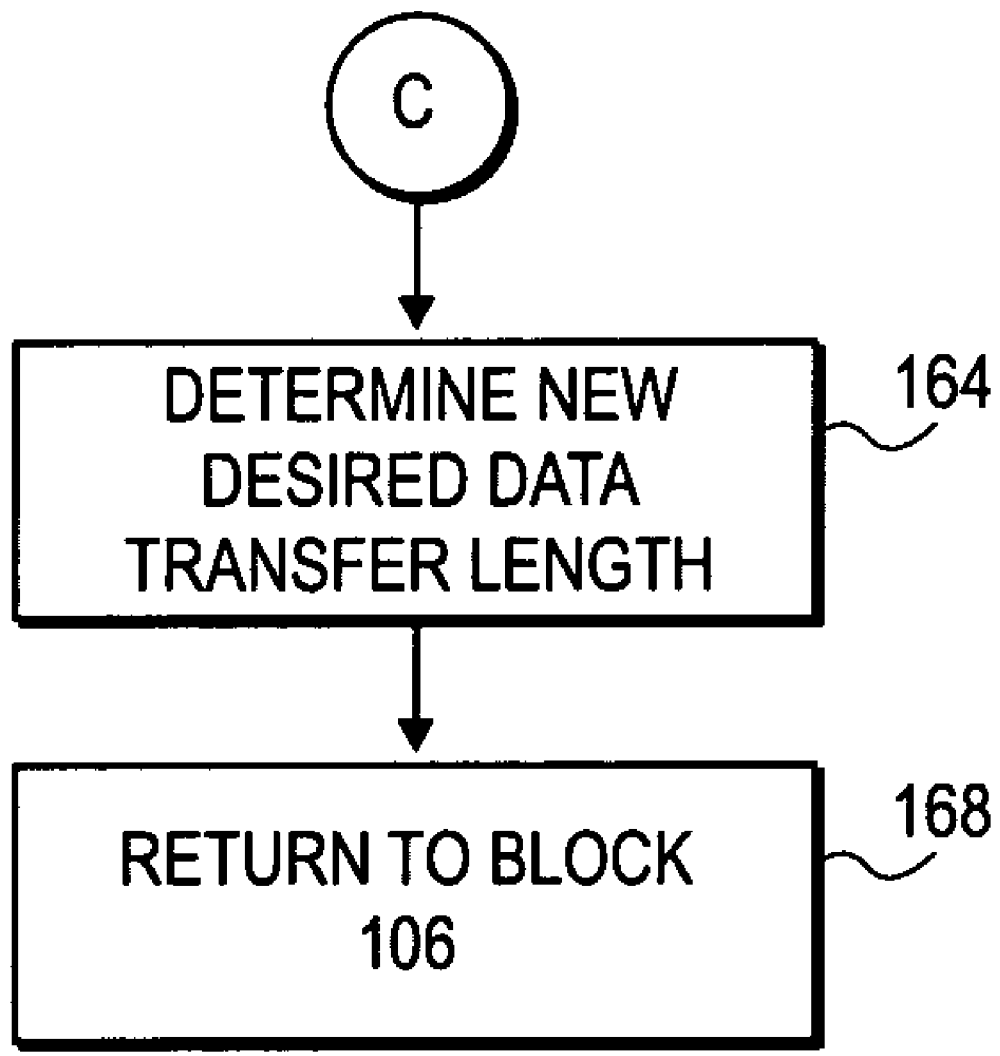

FIGS. 1A, 1B, and 1C illustrate one embodiment of a flowchart of the method to dynamically select a data packet. At block 102, the desired data transfer length is determined. In other words, the length of the data to be segmented and transmitted is identified. At block 106, the available packets are identified. A data packet is defined by the number of time-slots required to transmit the packet, the maximum data length that can be transmitted by the packet, and possible minimum data length requirement of the packet.

Figure 2:
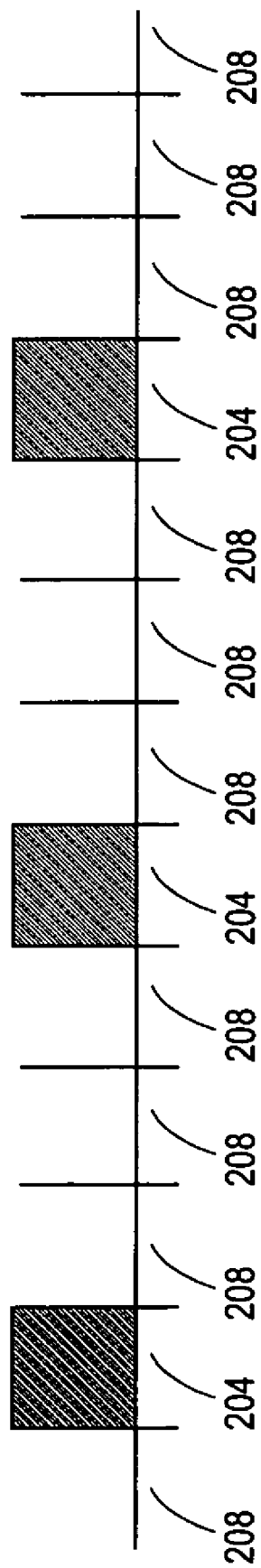
FIG. 2 illustrates one embodiment of time-division multiplexing.

At block 110, the maximum available time-slots to transmit the data are determined. In one embodiment, multiple agents are contending for transmitting data to multiple devices through a transmission medium. In this embodiment, an arbitration mechanism such as time-division multiplexing is implemented to iterate over all the possible segmentation possibilities and select an agent and a corresponding device. For example, an algorithm can be implemented to perform time-division multiplexing of isochronous traffic with available slots for asynchronous traffic as illustrated in FIG. 2. In another embodiment, a single agent transmits data to a single device through the transmission medium. In this case, block 110 is deleted from the flowchart because the number of slots available for the data transfer are infinite.

At block 114, from the available data packets identified at block 106, the data packets that fit into the available time-slots of block 110 are identified. If there are multiple format options for segmenting the data into multiple packets, these data packets are identified at block 114. At block 118, from the data packets identified at block 114, the packets that meet a minimum transfer length requirement are identified. In other words, packets that are too small for the transfer length are not identified in block 118. Blocks 114 and 118 thus eliminate the packets that are too large for the available time-slots and the packets that are too small for the data transfer length.

At block 122, from the packets identified at block 118, the packets that can successfully transfer the entire length are identified. The packets identified at block 122 fit into the available time-slots, meet the minimum packet criteria, and can successfully transmit the entire data length.

At block 136, a determination is made whether any data packets were identified at block 122. At block 138, the packets identified at block 122 are submitted to block 146. If no data packets are identified at block 122, at block 140, the packets identified at block 118 are submitted to block 146. The packets identified at block 118 meet the slot and the minimum length criteria.

Block 146 is also referred to as the priority selection block. At block 146, from the packets identified at blocks 122 or 118, the packet that can send the most data in the shortest amount of time is identified. At block 146, if no packets are received from the blocks 122 or 118, it is determined that data segmentation on this data stream cannot occur for the parameters.

At block 150, data is transmitted through the packet identified at block 146. At block 150, a determination is made whether the entire desired data transfer length was transmitted. If yes, the flow diagram ends at block 158. If no, the new desired data transfer length is at block 164 by subtracting the data length transmitted at block 150 from the desired data transfer length of block 102. Following, at block 168, the flow diagram returns to block 168 to process the new desired data transfer length calculated at block 102.

The method illustrated in FIG. 1 is now illustrated by way of an example. The example is related to the Bluetooth wireless technology which supports both circuit switching for isochronous traffic as well as packet switching for asynchronous traffic. In this example, the desired data transfer length is 1000 bytes of asynchronous data. The available data packets are illustrated in Table 1.

TABLE 1

Bluetooth supported Data Packets for Asynchronous Traffic

| Data Packets | Time-Slot | Payload length (bytes) |
| --- | --- | --- |
| DM1 | 1 | 0-17 |
| DH1 | 1 | 0-27 |
| DM3 | 3 | 0-121 |
| DH3 | 3 | 0-183 |
| DM5 | 5 | 0-224 |
| DH5 | 5 | 0-339 |
| AUX1 | 1 | 0-29 |

DM1 and DH1 packets are preferred in a noisy environment because they require only one time-slot for transmission and contain a small amount of data. The transmission of the DM1 and DH1 packets is more robust and less prone to error than the DM3 and DH3 packets. The advantage of the DM3 and DH3 packets is that they can transmit a larger amount of data than the DM1 and DM1 packets. Thus, the DM3 and DH3 packets allow the transmitter logic to be put in a low power mode earlier than the DM1 and DH1 packets.

FIG. 2 illustrates the maximum available time-slots to transmit the 1000 bytes of asynchronous data. According to FIG. 2, every fourth time-slot 204 is reserved to service the isochronous traffic. The asynchronous traffic can take place in the three time-slots 208 between the two time-slots 204 reserved for isochronous traffic.

According to Table 1, the packets DM1, DH1, DM3 and DH3 fit into the three available time-slots. DM1 and DH1 are too small and thus do not meet the minimum transfer length requirement. None of the packets of Table 1 can transmit the entire 1000 bytes. DH3 is preferable to DM3 because it can transmit more data. Following the transmittal of 183 bytes through DH3, the new desired data transfer length is 817 bytes. The algorithm of this example is repeated for the 817 bytes of asynchronous data.

Since Bluetooth wireless technology is able to support a network of up to 8 devices, this example can be extended to consider the scheduling of several packets of asynchronous traffic targeting different devices. The data type determination based on available slots and packet length becomes proportionally complicated.

Figure 3:
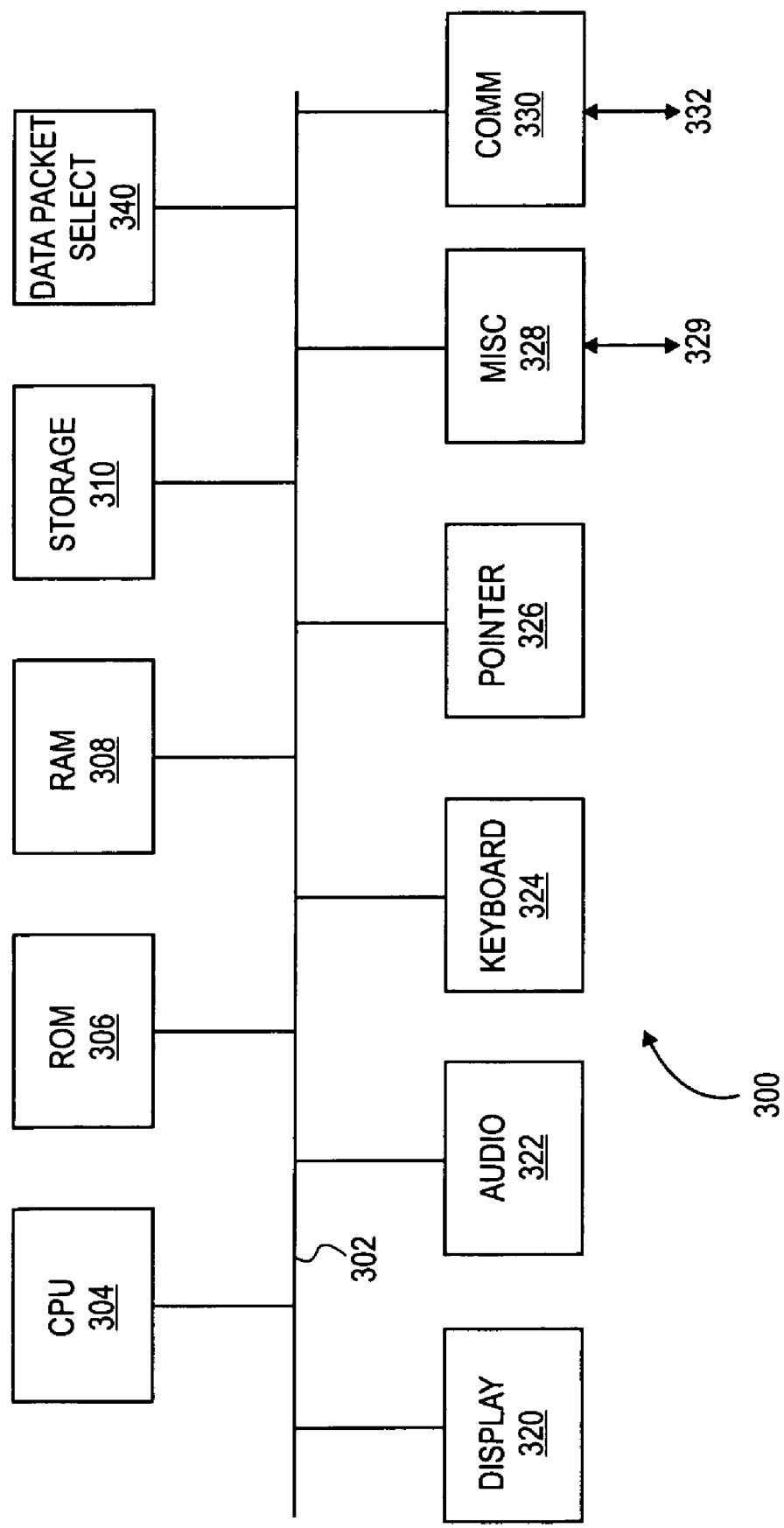
FIG. 3 illustrates one embodiment of a block diagram of the computing system to dynamically select a data packet.

FIG. 3 illustrates a block diagram of an exemplary embodiment of the computing system 300 to dynamically select a data packet. The computing system can be a component of a network server or a network client. The block diagram is a high level conceptual representation and may be implemented in a variety of ways and by various architectures.

In one embodiment, the data packet select module 340 is configured to perform the algorithm illustrated in the flowchart of FIG. 1. In one embodiment, the packet select module 340 is a programmable module implemented in hardware. In another embodiment, the packet select module 340 is a programmable module implemented in firmware.

In another embodiment, the Random Access Memory (RAM) 308 includes the instructions to execute the algorithm illustrated in FIG. 1. In yet another embodiment, the Read Only Memory (ROM) 306 includes the instructions to execute the algorithm illustrated in FIG. 1. The instructions stored in the RAM 308 or the ROM 306 are executed by the Central Processing Unit (CPU) 304.

The computer system 300 also includes communications means such as the bus system 302 for communicating information. The RAM or other dynamic storage device 308 is coupled to the bus 302 for storing information and instructions to be executed by the CPU 304. The ROM and/or other static storage device 306 is coupled to the bus 302 for storing static information and instructions for the CPU 304. The computing system 300 can also include storage means such as the data storage device 310 coupled to the bus 302. The computing system 300 can also be coupled via the bus 302 to the display device 320, audio 322, keyboard 324, pointer 326, miscellaneous input/output (I/O) device 328, and communications device 330. The I/O device 328 can be connected via the input/output port 329 to other devices or systems.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

In addition, the instructions to perform the methods as described above could alternatively be stored on other forms of computer-readable mediums. A machine-readable medium includes any mechanism that provides (e.g., stores and/or transmits) information in a form readable by a machine (e.g., a computer). A machine-readable medium is understood to include any mechanism for storing or transmitting information in a form readable by a machine (e.g., computer). For example, a machine-readable medium includes read only memory (ROM); random access memory (RAM); magnetic disk storage media; optical storage media, and flash memory devices,

What is claimed is:

1. A method comprising:
   identifying available data packets for transmission, the available data packets being of a plurality of data packet types corresponding to different numbers of time-slots required for data packet transmission;
   determining how many time-slots are available for the transmission;
   upon determining a number of the available time slots, identifying a subset of the plurality of data packet types that fit into the available time-slots and meet a minimum transfer length requirement;
   determining whether any of the identified data packet types are capable of transmitting an entire required data length;
   if any of the identified data packet types are capable of transmitting the entire required data length, choosing for the transmission, from the data packet types capable of transmitting the entire required data length, a data packet type capable of transmitting most data in a shortest time; and
   if none of the identified data packets are capable of transmitting the required data length, choosing for the transmission, from the identified data packet types, a data packet type capable of transmitting most data in a shortest time.

2. The method of claim 1 wherein the identified data packet types not only fit into the available time-slots and meet the minimum transfer length requirement but are also least prone to a transmission error.

3. The method of claim 1 wherein the identified data packet types not only fit into the available time-slots and meet the minimum transfer length requirement but can also be transmitted in a transmitter logic low power mode.

4. A computer-readable medium having stored thereon a set of instructions, which when executed by a processor, cause the processor to perform a method comprising:
- identifying available data packets for transmission, the available data packets being of a plurality of data packet types corresponding to different numbers of time-slots required for data packet transmission;
- determining how many time-slots are available for the transmission;
- upon determining the number of the available time slots, identifying a subset of the plurality of data packet types that fit into the available time-slots and meet a minimum transfer length requirement;
- determining whether any of the identified data packet types are capable of transmitting an entire required data length;
- if any of the identified data packet types are capable of transmitting the entire required data length, choosing for the transmission, from the data packet types capable of transmitting the entire required data length, a data packet type capable of transmitting most data in a shortest time; and
- if none of the identified data packets are capable of transmitting the required data length, choosing for the transmission, from the identified data packet types, a data packet type capable of transmitting most data in a shortest time.

5. The computer-readable medium of claim 4 wherein the identified data packet types not only fit into the available time-slots and meet the minimum transfer length requirement but are also least prone to a transmission error.

6. The computer-readable medium of claim 4 wherein the identified data packet types not only fit into the available time-slots and meet the minimum transfer length requirement but can also be transmitted in a transmitter logic low power mode.

7. A computing system comprising:
- a memory to store instructions; and
- a processor, coupled to the memory, the processor executing the instructions that cause the processor to:
- identify available data packets for transmission, the available data packets being of a plurality of data packet types corresponding to different numbers of time-slots required for data packet transmission;
- determine how many time-slots are available for the transmission;
- identify, upon determining the number of the available time slots, a subset of the plurality of data packet types that fit into the available time-slots and meet a minimum transfer length requirement; and
- determine whether any of the identified data packet types are capable of transmitting an entire required data length,
- if any of the identified data packet types are capable of transmitting the entire required data length, choose for the transmission, from the data packet types capable of transmitting the entire required data length, a data packet type capable of transmitting most data in a shortest time, and
- if none of the identified data packets are capable of transmitting the required data length, choose for the transmission, from the identified data packet types, a data packet type capable of transmitting most data in a shortest time.

8. The computing system of claim 7 wherein the identified data packet types not only fit into the available time-slots and meet the minimum transfer length requirement but are also least prone to a transmission error.

9. The computing system of claim 7 wherein the identified data packet types not only fit into the available time-slots and meet the minimum transfer length requirement but can also be transmitted in a transmitter logic low power mode.

* * * * *